(12) United States Patent
Sriram

(10) Patent No.: US 6,331,976 B1
(45) Date of Patent: Dec. 18, 2001

(54) CIRCUITS SYSTEM AND METHODS FOR SYNCHRONIZATION WORD DETECTION IN BITSTREAM COMMUNICATIONS APPARATUS

(75) Inventor: Sundararajan Sriram, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/987,992

(22) Filed: Dec. 10, 1997

(51) Int. Cl.[7] .................................................. H04J 3/06
(52) U.S. Cl. ............................................ 370/350; 370/513
(58) Field of Search .................................... 370/345, 349, 370/350, 503, 509, 510, 511, 512, 513, 514; 375/354, 365, 366, 368, 369; 714/819, 820, 821

(56) References Cited

U.S. PATENT DOCUMENTS 5,555,247 * 9/1996 Matsuoka et al. .................... 370/350

OTHER PUBLICATIONS

R. A. Scholtz, "Frame Synchronization Techniques," *IEEE Transactions on Communications*, vol. COM–28, No. 8, 1980.

(List continued on next page.)

*Primary Examiner*—Kwang B. Yao
(74) *Attorney, Agent, or Firm*—Pedro P. Hernandez; W. James Brady, III; Frederick J. Telecky, Jr.

(57) ABSTRACT

A communication system (10) comprising circuitry (RCVR1) for receiving a bitstream packet (P). The bitstream packet comprises at least three groups of bits: (i) a plurality of preamble prefix bits having a predetermined bit pattern; (ii) a plurality of synchronization word bits following the plurality of preamble prefix bits; and (iii) a plurality of data bits following the plurality of synchronization word bits. The system further includes circuitry for completing a carrier and clock recovery operation in response to receiving a first portion of the plurality of preamble prefix bits. Still further, the system includes circuitry (30) for determining a location of the plurality of synchronization word bits within the bitstream packet. The circuitry for determining comprises circuitry (36) for performing a number of comparisons between a bit test pattern vector (32) and a sample vector (34) of bits from the bitstream packet. The bit test pattern vector and the sample vector of bits both change for each of the number of comparisons. For at least one of the number of comparisons the sample vector of bits comprises a second portion of the plurality of preamble prefix bits following the first portion of the plurality of preamble prefix bits. Further, for at least some of the number of comparisons, the bit test pattern vector comprises one or more bits matching the predetermined bit pattern of the plurality of preamble prefix bits and further comprises one or more bits matching the synchronization word bits.

32 Claims, 5 Drawing Sheets

OTHER PUBLICATIONS

J.L. Massey, "Optimum Frame Synchronization," *IEEE Transactions on Communications,* vol. COM–20, No. 2, 1972.

A.G. Dabak, "Optimum Linear Receiver for Frame Synchronization in TDMA Systems," Proceedings of GLOBECOMM 1996.

T. Schaub and A. Hansson, Frame Synchronization for Spontaneous Transmissions, Proceedings of GLOBECOMM 1990.

W.H. Sheen and C.T. Shih, "On the Performance Evaluation, Selection, and Design of Unique–Words for TDMA Systems," *IEEE Transactions on Vehicular Technology,* vol. 44, No. 1, pp. 111–120, 1995.

G.L. Lui, and H.H. Tan, "Frame Synchronization for Gaussian Channels," *IEEE Transactions on Communications,* vol. 35, No. 8, pp. 818–829, 1987.

P. Robertson, "A Generalized Frame Synchronizer," Proceedings of GLOBECOMM 1992.

P.F. Dreissen, "Performance of Frame Synchronization in Packet Transmission Using Bit Erasure Information," *IEEE Transactions on Communications,* vol. 39, No. 4, pp. 567–573, 1991.

European Telecommunications Standards Institute, Digital European Cordless Telephone, Ref: DE/RES–300102, 1992.

* cited by examiner

| ROW | | | | | | | | | | | | | | | | | |
|---|---|---|---|---|---|---|---|---|---|---|---|---|---|---|---|---|---|
| 1 | BITS AFTER CCR | 0 | 1 | 0 | 1 | 1 | 1 | 1 | 1 | 0 | 0 | 1 | 1 | 1 | 0 | 0 | 1 |
| 2 | BIT REPRESENTATION | −1 | +1 | −1 | +1 | +1 | +1 | +1 | +1 | −1 | −1 | +1 | +1 | +1 | −1 | −1 | +1 |

Row 3: $\hat{m}=0$, $w = y_1 : y_L$
```
  [ 0 1 0 1 1 1 1 1 0 0 1 1 ] 1 0 0 1
    1 1 1 1 0 0 1 1 1 0 0 1
```

Row 4: $\hat{m}=1$, $w = y_2 : y_{L+1}$
```
  0 [ 1 0 1 1 1 1 1 0 0 1 1 1 ] 0 0 1
    1 1 1 1 0 0 1 1 1 0 0 1
```

Row 5: $\hat{m}=2$, $w = y_3 : y_{L+2}$
```
  0 1 [ 0 1 1 1 1 1 0 0 1 1 1 0 ] 0 1
      1 1 1 1 0 0 1 1 1 0 0 1
```

Row 6: $\hat{m}=3$, $w = y_4 : y_{L+3}$
```
  0 1 0 [ 1 1 1 1 1 0 0 1 1 1 0 0 ] 1
        1 1 1 1 0 0 1 1 1 0 0 1
```

Row 7: $\hat{m}=4$, $w = y_5 : y_{L+4}$
```
  0 1 0 1 [ 1 1 1 1 0 0 1 1 1 0 0 1 ]
          1 1 1 1 0 0 1 1 1 0 0 1
```

| ROW | | | | | | | | | | | | | | | | | |
|---|---|---|---|---|---|---|---|---|---|---|---|---|---|---|---|---|---|
| 1 | BITS AFTER CCR | 0 | 1 | 0 | 1 | 1 | 1 | 1 | 1 | 0 | 0 | 1 | 1 | 1 | 0 | 0 | 1 |
| 2 | BIT REPRESENTATION | −1 | +1 | −1 | +1 | +1 | +1 | +1 | +1 | −1 | −1 | +1 | +1 | +1 | −1 | −1 | +1 |

Row 3: $\hat{m} = 0$ — 0 1 0 1 1 1 1 1 0 0 1 1 1 0 0 1
1 → [ 1 1 1 1 1 0 0 1 1 1 0 0 ] $S^0$ Row 4: $\hat{m} = 1$ — 0 1 0 1 1 1 1 1 0 0 1 1 1 0 0 1
0 1 → [ 0 1 1 1 1 1 0 0 1 1 1 0 ] $S^1$ Row 5: $\hat{m} = 2$ — 0 1 0 1 1 1 1 1 0 0 1 1 1 0 0 1
1 0 1 → [ 1 0 1 1 1 1 1 0 0 1 1 1 ] $S^2$ Row 6: $\hat{m} = 3$ — 0 1 0 1 1 1 1 1 0 0 1 1 1 0 0 1
0 1 0 1 → [ 0 1 0 1 1 1 1 1 0 0 1 1 ] $S^3$ Row 7: $\hat{m} = 4$ — 0 1 0 1 1 1 1 1 0 0 1 1 1 0 0 1
1 0 1 0 1 → [ 1 0 1 0 1 1 1 1 1 0 0 1 ] $S^4$ Row 8: $\hat{m} = 5$ — 0 1 0 1 1 1 1 1 0 0 1 1 1 0 0 1
0 1 0 1 0 1 → [ 0 1 0 1 0 1 1 1 1 1 0 0 ] $S^5$ Row 9: $\hat{m} = 6$ — 0 1 0 1 1 1 1 1 0 0 1 1 1 0 0 1
1 0 1 0 1 0 1 → [ 1 0 1 0 1 0 1 1 1 1 1 0 ] $S^6$

| ROW | | | | | | | | | | | | | | | | | | | |
|---|---|---|---|---|---|---|---|---|---|---|---|---|---|---|---|---|---|---|---|
| 1 | BITS AFTER CCR | 0 | 1 | 0 | 1 | 1 | 1 | 1 | 1 | 0 | 0 | 1 | 1 | 1 | 0 | 0 | 1 | 1 | 0 |
| 2 | BIT REPRESENTATION | −1 | +1 | −1 | +1 | +1 | +1 | +1 | +1 | −1 | −1 | +1 | +1 | +1 | −1 | −1 | +1 | +1 | −1 |

Row 3: $\hat{m} = 0$    0 1 0 1 1 1 1 1 0 0 1 1 1 0 0 1 1 0
$s^0$: 1 1 1 1 0 0 1 1 1 0 0 1

Row 4: $\hat{m} = 1$    0 1 0 1 1 1 1 1 0 0 1 1 1 0 0 1 1 0
$s^1$: 1 1 1 1 1 0 0 1 1 1 0 0 1

Row 5: $\hat{m} = 2$    0 1 0 1 1 1 1 1 0 0 1 1 1 0 0 1 1 0
$s^2$: 0 1 1 1 1 1 0 0 1 1 1 0 0 1

Row 6: $\hat{m} = 3$    0 1 0 1 1 1 1 1 0 0 1 1 1 0 0 1 1 0
$s^3$: 1 0 1 1 1 1 1 0 0 1 1 1 0 0 1

Row 7: $\hat{m} = 4$    0 1 0 1 1 1 1 1 0 0 1 1 1 0 0 1 1 0
$s^4$: 0 1 0 1 1 1 1 1 0 0 1 1 1 0 0 1

Row 8: $\hat{m} = 5$    0 1 0 1 1 1 1 1 0 0 1 1 1 0 0 1 1 0
$s^5$: 1 0 1 0 1 1 1 1 1 0 0 1 1 1 0 0 1

Row 9: $\hat{m} = 6$    0 1 0 1 1 1 1 1 0 0 1 1 1 0 0 1 1 0
$s^6$: 0 1 0 1 0 1 1 1 1 1 0 0 1 1 1 0 0 1

CIRCUITS SYSTEM AND METHODS FOR SYNCHRONIZATION WORD DETECTION IN BITSTREAM COMMUNICATIONS APPARATUS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to data communications, and are more particularly directed to circuits, systems, and methods for synchronization word detection in bitstream communications apparatus. By way of example, therefore, the background and embodiments are discussed below in the context of time division multiple access ("TDMA") apparatus.

TDMA bitstream systems are typically implemented in the context of wireless communications, and also may exist in other environments where it is desirable to communicate a common bitstream to various receivers where each receiver is able to distinguish information intended for it versus information intended for a different receiver. In this regard and as detailed later, a TDMA bitstream includes packets of information. Each information packet generally includes user data which is preceded in the packet by what is referred to in this document as a synchronization word. The synchronization word is a bit pattern known to each receiver. Thus, a receiver may detect the synchronization word as a basis for defining the boundaries of other information in the packet. More specifically, typically following the synchronization word is a receiver identifier, which itself is followed by user data intended for the identified receiver. Consequently, by detecting the synchronization word, the receiver may then determine the boundary of the synchronization word itself. Typical systems detect the synchronization word after having received a portion, but not all, of the synchronization word. Thus, once a sufficient portion of the synchronization word has been received and determined to be a part of the synchronization word, the receiver may then determine the end of the synchronization word and thereby define the beginning and end of the other information within the packet (i.e., the receiver identifier and the user data).

Given the above, one skilled in the art will appreciate the need to accurately and efficiently identify the synchronization word in TDMA communications. Accuracy in detecting the synchronization word is critical because a failure to identify the synchronization word will cause a failure of communication with respect to the remainder of the information packet. Efficiency in detecting the synchronization word manifests itself in various manners. For example, one factor affecting the ability to detect the synchronization word is based on the power of the transmitted signal. In this regard, a higher power output provides a larger amplitude in transmitted signal. This increased amplitude may be used to overcome any noise in the signal, thereby improving the ability to properly detect the synchronization word by the receiver(s). However, as is common in electronic circuit implementation, an increased power requirement is often considered inefficient. Thus, efficiency suggests or may require reducing the power output signal while still obtaining a satisfactory probability of proper detection of the synchronization word. Another efficiency example arises in the timing of synchronization word detection. Particularly, note that an amount of elapsed time may be measured from the time the beginning of the synchronization word is received by a receiver and the time the receiver thereafter detects that the incoming information constitutes the synchronization word. If this elapsed time becomes too large, it may be considered a delay on the operation of the receiver. Such a delay also may be considered in evaluating the efficiency of the receiver. As yet another example, some prior art systems provide impressive levels of accuracy in synchronization word detection, but do so by requiring specific attributes of the signal to be known to the receiver. For example, one such system, as described below, requires that the receiver have access to the variance of the signal-to-noise ratio ("SNR") of the incoming signal in order to identify an incoming synchronization word. This SNR variance may be difficult and complex to ascertain. Additionally, greater computational ability is likely to be required of the receiver to detect the incoming synchronization word even given the SNR variance. In some systems, therefore, these additional demands may be deemed inefficient given design or other criteria considered for the system.

In view of the above, there arises a need to address the drawbacks of the prior art. Thus, the inventive embodiments below contemplate such drawbacks and provide improved circuits, systems, and methods for synchronization word detection, such as in TDMA apparatus.

BRIEF SUMMARY OF THE INVENTION

In one embodiment, there is a communication system comprising circuitry for receiving a bitstream packet. The bitstream packet comprises at least three groups of bits: (1) a plurality of preamble prefix bits having a predetermined bit pattern; (2) a plurality of synchronization word bits following the plurality of preamble prefix bits; and (3) a plurality of data bits following the plurality of synchronization word bits. The system further includes circuitry for completing a carrier and clock recovery operation in response to receiving a first portion of the plurality of preamble prefix bits. Still further, the system includes circuitry for determining a location of the plurality of synchronization word bits within the bitstream packet. The circuitry for determining comprises circuitry for performing a number of comparisons between a bit test pattern vector and a sample vector of bits from the bitstream packet. The bit test pattern vector and the sample vector of bits both change for each of the number of comparisons. For at least one of the number of comparisons the sample vector of bits comprises a second portion of the plurality of preamble prefix bits following the first portion of the plurality of preamble prefix bits. Further, for at least some of the number of comparisons, the bit test pattern vector comprises one or more bits matching the predetermined bit pattern of the plurality of preamble prefix bits and further comprises one or more bits matching the synchronization word bits. Other circuits, systems, and methods are also disclosed and claimed.

DETAILED DESCRIPTION OF THE INVENTION

Figure 1:
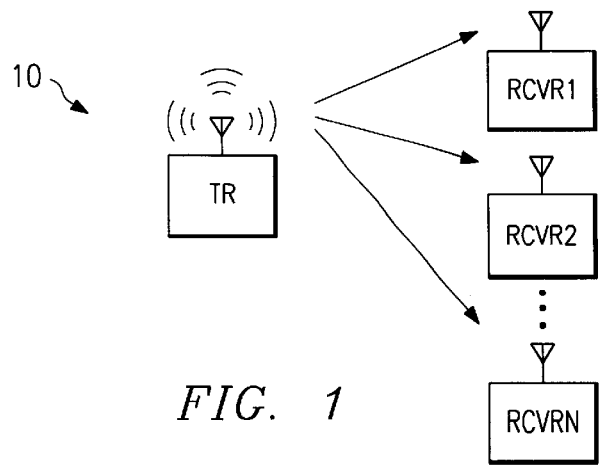
FIG. 1 illustrates a communication system as an example of a configuration in which both the prior art and the present inventive embodiments may be implemented.

Before proceeding with a detailed discussion of the preferred inventive embodiments and by way of presenting a more extensive introduction, FIGS. 1 through as well as the following discussion present an explanation of various time division multiple access ("TDMA") concepts. These concepts, as will be appreciated by one skilled in the art, are relevant with respect to both the prior art as well as the inventive embodiments described later. As further background, after FIGS. 1 through 3 are FIGS. 4a through 6 which, with a corresponding discussion, present a basis for discussing various prior art systems currently implemented in a context such as that of FIGS. 1 through 3.

FIG. 1 illustrates a diagram of a wireless system designated generally at 10. System 10 includes a transmitter TR as well as an integer number N of receivers designated as RCVR1 through RCVRN. The integer N is used to depict that a wireless system such as system 10 may use various different numbers of receivers. System 10 is typical of that which implements TDMA communication. Thus, system 10 is commonly some type of wireless system, such a that used in cellular radio and satellite systems. In any event, turning to the components of system 10, transmitter TR includes sufficient processing and communication hardware and software to transmit a TDMA bitstream, and each receiver RCVR1 through RCVRN includes sufficient processing and communication hardware and software to receive and properly interpret the TDMA bitstream. The hardware and software (e.g. firmware) for both transmitter TR and receivers RCVR1 through RCVRN may be implemented using various circuitry including integrated circuits. Such implementations are further appreciated given an understanding of the TDMA bitstream as detailed immediately below.

Figure 2:
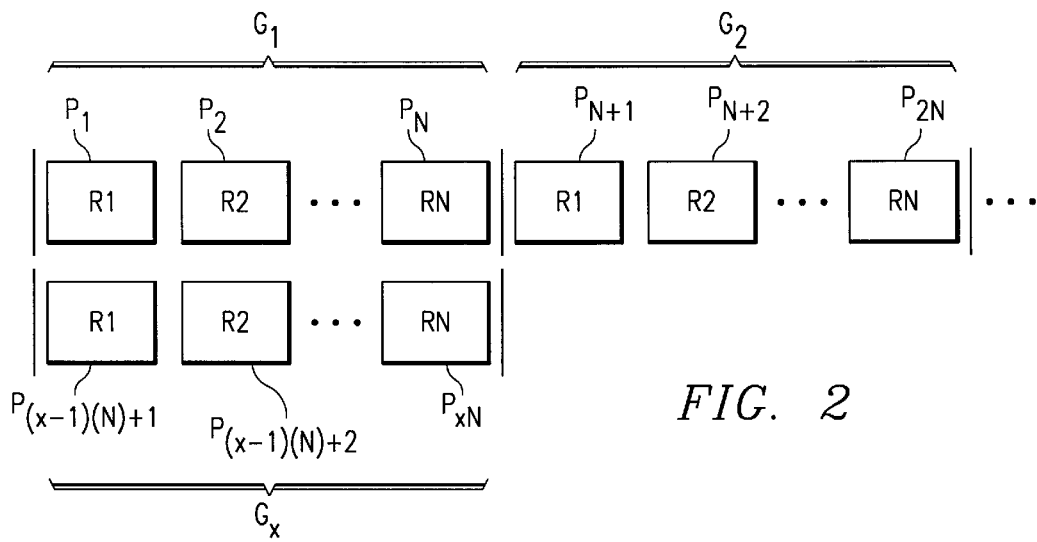
FIG. 2 illustrates a time division multiple access ("TDMA") bitstream.
Figure 3:
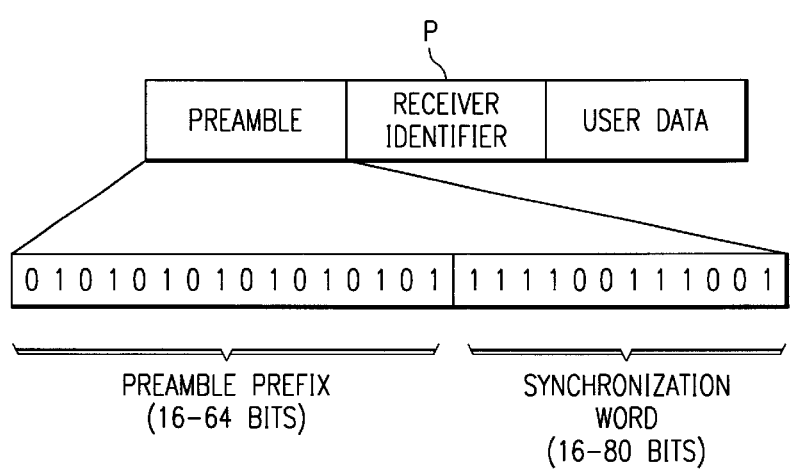
FIG. 3 illustrates the breakdown of information in a single packet of the bitstream of FIG. 2.

FIG. 2 illustrates a sequence of binary packets which as a whole form a TDMA bitstream as communicated from transmnitter TR to receivers RCVR1 through RCVRN. Each packet in the TDMA sequence is designated with a capital "P", and further with a subscript which starts at "1" for the packet farthest to the left and increments for each packet to the right from $P_1$ for reasons apparent from the following discussion. The TDMA packets of FIG. 2 are further broken down into an integer number X of groups, designated $G_1$ through $G_X$. Further, each packet in a group corresponds to one of receivers RCVR1 through RCVRN in FIG. 1. To demonstrate this one-to-one correspondence, each packet is further labeled with the capital letter "R" followed by an integer which identifies the same integer of the receiver in FIG. 1 to which the packet is directed. For example, in group $G_1$, packet $P_1$ is labeled R1 and, thus, it is intended that packet $P_1$ is communicated by transmitter TR to provide data, as further appreciated later, to receiver RCVR1. As another example in group $G_1$, packet $P_N$ is labeled RN and, thus, is communicated by transmitter TR to provide data to receiver RCVRN.

Given the conventions established thus far, one skilled in the art may appreciate the terms "time division multiple access." Specifically, for a given time period such as is required to communicate a single group of packets, that time period is divided into slots (i.e., packets) so that multiple receivers may each access meaningful information during a part of that time period. In other words, for the N receivers, each is designated a slot in the time period, and that slot repeats for each group of successive packets transmitted by the receiver. Again by way of example, receiver RCVRM is allotted the first slot in the time divided sequence of FIG. 2, so the first packet in each group is directed to receiver RCVR1. As another example, receiver RCVRN is allotted the $N_{th}$ slot in the time divided sequence, so the $N_{th}$ packet in each group is directed to receiver RCVRN. Having appreciated the division of time in this manner, it should be further understood how the same conventions apply to each of the packets in the TDMA sequence of FIG. 2, commencing with packet $P_1$ as the first of N packets the first group $G_1$ and concluding with packet $P_{XN}$ as the $N_{th}$ packet in the $X^{th}$ group $G_X$.

FIG. 3 illustrates a breakdown of the various portions of serial information implemented in each of packets $P_1$ through $P_{XN}$ of FIG. 2. Since the representations of FIG. 3 may apply to any of the FIG. 2 packets, then the FIG. 3 packet is labeled generally only with a P and no subscript is included. Turning to packet P of FIG. 3, as a matter of introduction from left to right in the Figure, packet P includes the following three portions: (1) a preamble; (2) a receiver identifier; and (3) user data. Each of these three portion is discussed below.

The preamble may be referred to in the art in other manners such as a header, but for purposes of consistency is referred to as the preamble for the remainder of this document. The preamble includes two portions of binary information which are further illustrated in FIG. 3. The first (i.e., to the left) preamble portion is a prefix and the second preamble portion is a synchronization word. Each of these portions is discussed separately below.

The preamble prefix typically consists of an alternating bit sequence, such as a 1 followed by a 0 followed by a 1 and so forth as shown by way of example in FIG. 3. The preamble prefix may vary in length for different systems, but for a given system is fixed and is commonly on the order of 16 to 64 bits. Note that the alternating pattern also may include more than single bits, such that a first group of an integer F number of 1's is followed by a second group of the integer F number of 0's, which itself is followed by the integer F number of 1's and so forth. The preamble prefix provides a means for carrier and clock recovery ("CCR") as known in the art. In general, CCR is a timing acquisition procedure. In other words, note that each receiver receiving a TDMA bitstream first receives the preamble prefix due to its location at the beginning of a packet. Thus, a receiver uses these initial bits to adjust its internal timing to ascertain the proper boundary between successive bits in the preamble prefix. For example, this timing may be used to synchronize a phase-locked-loop or other comparable circuitry. In any event, by ascertaining the bit boundaries, the receiver has established a timing basis so successive bits following the preamble prefix are properly distinguished from one another.

The synchronization word consists of a binary sequence which is distinguishable from the preamble prefix, and is further distinguishable from the remainder of the packet bits as explored later. The synchronization word may vary in length for different systems, but for a given system is fixed and is commonly on the order of 16 to 80 bits. For example, the Digital European Cordless Telephone ("DECT") system implements a synchronization word of 16 bits, while the MIL-STD-188–183 standard implements a synchronization word of 74 bits. In any event, note that the synchronization word may be any set of bits which serves the purpose of distinguishing itself from both the preamble prefix as well as the information to follow the synchronization word. Accordingly, once the CCR function is accomplished by a receiver in connection with a first part of the prefix bits, the beginning of the synchronization word will follow at some number of zero or more bits thereafter and provide a separator which defines the end of the sequence of prefix bits. Thus, and as appreciated later, each receiver of FIG. 1 operates to detect the synchronization word and, in doing so, is able to conclude that the preamble prefix is complete. Moreover, by determining the location of the last bit (i.e., the end) of the synchronization word, each receiver is therefore notified, by definition, that the preamble is complete and that the remaining two portions (i.e., the receiver identifier and the user data) of the packet are the next presented bits in the packet. Before proceeding, note further that the preferred embodiments discussed later are particularly directed to detecting the synchronization word. Thus, by way of example, a random pattern of bits is shown in FIG. 3 for the synchronization word, where this pattern is used for the remainder of the document to demonstrate the preferred embodiment aspects for detecting a synchronization word. Clearly, however, other patterns of bits may be used for the synchronization word.

The receiver identifier of packet P in FIG. 3 performs the simple function its name suggests, that is, it identifies to which of the receivers the particular packet is directed. By way of example and returning to FIG. 1, if packet $P_1$ were detailed, it would show a receiver identifier which identified receiver RCVR1. As another example, if packet $P_{N+2}$ were detailed, it would show a receiver identifier which identified receiver RCVR2. Note the manner in which this identification is encoded may be performed in various techniques. Regardless of the implementation, it should be appreciated that each receiver may evaluate the receiver identifier for each packet in the TDMA bitstream, and in doing so is then informed if a given packet is directed to itself or to some other receiver.

The user data of packet P in FIG. 3 merely represents any type of data which may be transmitted using a serial data stream. Thus, such data may be representative of a type of signal where complete binary precision is not required. Examples of these systems may include audio or video signals. On the other hand, the user data may be exact binary representations of digital characters or the like, where clearly a higher measure of integrity is required of the data. In any event, once a receiver has performed its CCR, located the synchronization word, and determined that it is identified in the receiver identifier of a packet, the receiver may then process the user data in whatever manner is consistent with the function of such data.

Figure 4A:
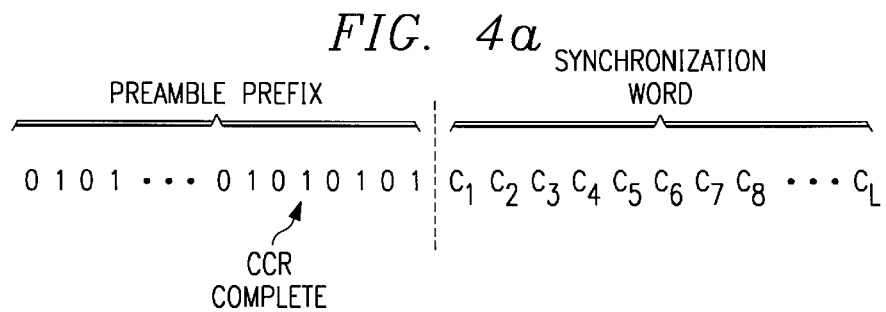
FIG. 4a illustrates an example of carrier and clock recovery ("CCR") occurring during receipt of a preamble prefix followed by a synchronization word.

Having explained the various portions of each TDMA packet, recall that it was earlier introduced that the present embodiments are directed to the detection of the synchronization word in each such packet. In this regard and by way of further introduction, note that the format of the preamble suggests that at some point while the preamble prefix is being received, the CCR function will be complete. However, to ensure proper CCR operation, it is likely the case that additional preamble prefix bits will be received after this point. In other words, it is expected that the number of preamble prefix bits is sufficiently large so that CCR completes before the beginning of the synchronization word is encountered. Given this expectation, it is then required that the receiver determine which of the bits in the incoming packet are still part of the latter portion of the preamble prefix, or in other words to determine the location of the beginning portion of the synchronization word. To further demonstrate these principles, FIG. 4a illustrates the preamble prefix bits from FIG. 3, followed by a synchronization word defining a vector C having an integer L number of bits. Each bit is designated by combining the letter "c" with a subscript designating the location of the bit within the synchronization word. Recall that at some point while receiving the preamble prefix, a receiver will complete its CCR function. By way of example, FIG. 4a includes a legend identifying this bit, which assumes that for the example CCR was completed after the twelfth preamble prefix bit. Moreover, for the remainder of this document, this type of preamble prefix bit is referred to as the preamble prefix bit which completed CCR. Of course, it should be understood that the bit itself actually does not complete CCR. Instead, the receiver accomplishes CCR having received this bit as well as the preceding preamble prefix bits. In any event, the next operation by the receiver is to determine the beginning of the synchronization word. Stated alternatively, for the remaining incoming bit sequence, the receiver must determine how many additional bits of the incoming sequence are still preamble prefix bits, even though CCR is complete. For the remainder of this document, this variable number of bits is referred to as "m" remaining preamble prefix bits. Moreover, in the example of FIG. 4a, it is clear that m=4. The techniques for determining this number are the subject of the preferred embodiments, which are described later after additional introduction regarding TDMA and the prior art.

Figure 4B:
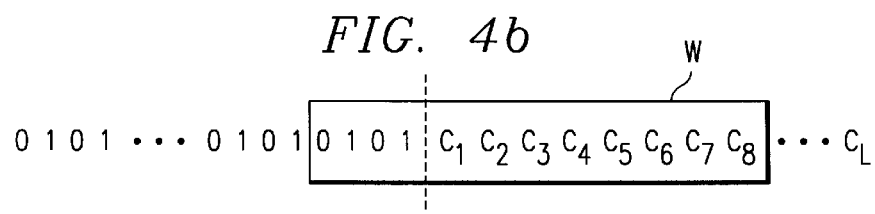
FIG. 4b illustrates a prior art technique for defining a bit window in the bitstream of FIG. 4b, where the bit window is shown immediately following the preamble prefix bit which completed CCR.
Figure 4C:
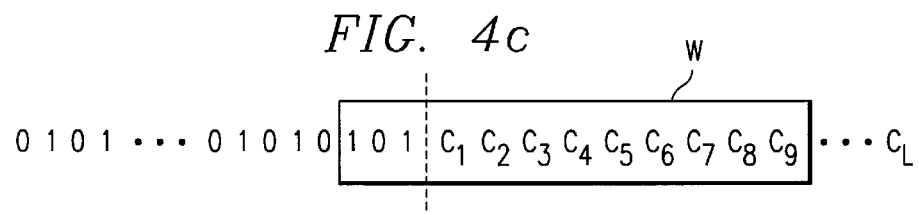
FIG. 4c illustrates the bit window of FIG. 4b after it advances to the next successive bit from the location shown in FIG. 4b.

FIG. 4b illustrates the same bitstream sequence of FIG. 4a, but further introduces the concept of a bit window W as used by various prior art techniques for synchronization word detection. Specifically, once CCR is complete, it is assumed that the beginning of the synchronization word will be encountered within some maximum number of bits. For the remainder of this document, this maximum is referred to as "M" bits. Given this assumption, it is common for synchronization word detection techniques to perform up to shown below, the representation is such that for each binary "0" of the synchronization word a value of −1 is stored in register 22 while for each binary "1"of the synchronization word a value of +1 is stored in register 22. In this regard, Table 1 below shows the synchronization word from FIG. 3 as well as the representation of it as stored in register 22:

TABLE 1

| Binary representation of synchronization word | 1 | 1 | 1 | 1 | 0 | 0 | 1 | 1 | 1 | 0 | 0 | 1 | 1 | 0 | 0 | 1 |
|---|---|---|---|---|---|---|---|---|---|---|---|---|---|---|---|---|
| Representation value stored in register 22 | +1 | +1 | +1 | +1 | −1 | −1 | +1 | +1 | +1 | −1 | −1 | +1 | +1 | −1 | −1 | +1 |

M successive evaluations of groups of bits in the packet, with each evaluation including L bits thereby defining the length of bit window W. For the first such evaluation, the sequence of bits included within window W begins with the next bit after the bit which completed CCR, as is shown by the location of bit window W in FIG. 4b. Thus, using one of various techniques described below, the bits included within bit window W are compared to the known synchronization word and a determination is made which reflects the likelihood that the bits in bit window W are the synchronization word. Lastly, for the sake of example, note that FIG. 4b demonstrates a bit window W encompassing twelve bits; in other words, L=12.

By way of further example, FIG. 4c once again illustrates the same sequence of FIGS. 4a and 4b, but in FIG. 4c bit window W has advanced one bit in the sequence of bits. Given this shift, the prior art again determines the likelihood that the window encompasses the synchronization word. Given these illustrations, one skilled in the art should thus appreciate that bit window W may continue to advance in this manner, until the applicable technique concludes a position of bit window W which, according to the criteria of the technique, encompasses the synchronization word. Since bit window W is L bits wide (e.g., L=12), then a complete evaluation may take up to L advancements of window W along the bitstream. The actual number of advancements, however, may vary based on the additional technique implemented to analyze the bits within the window, with some of the prior art techniques described immediately below.

Figure 5:
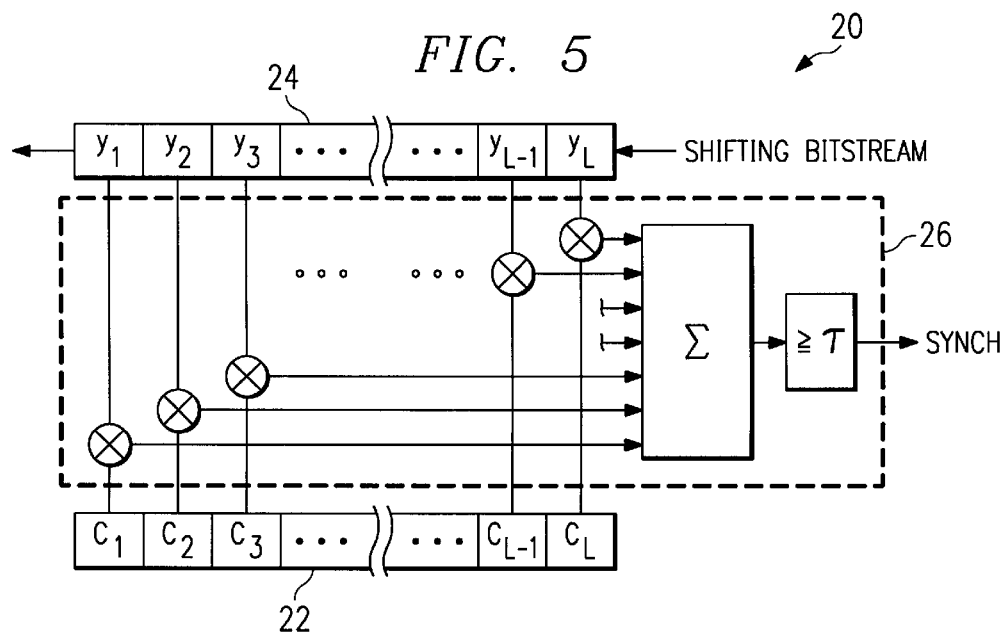
FIG. 5 illustrates a prior art system for comparing bits in a known synchronization word to corresponding bits in a bit window which shifts along the incoming TDMA bitstream.

FIG. 5 illustrates a prior art system 20 which is implemented in a combination of hardware and software to detect a synchronization word while further using the bit window technique described above. Thus, system 20 is implemented in each of receivers RCVR1 through RCVRN of system 10 of FIG. 1, thereby permitting TDMA communication and, more specifically, permitting detection of synchronization words in the TDMA bitstream.

System 20 includes two storage registers 22 and 24. Storage registers 22 and 24 represent hardware capable of storing representations of the binary signals described below. Thus, registers 22 and 24 may be implemented as various different types of circuit storage devices, such as memory or register space in an integrated circuit. In any event, each of these registers is discussed below.

Storage register 22 stores a representation of the synchronization word as it is known for a given system. By the convention of FIGS. 4a–c, therefore, storage register 22 is shown as storing bits $c_1$ through $c_L$ corresponding to the successive bits of the synchronization word, where recall that L is defined as the length (i.e., number of bits) of the synchronization word. Note further that it is stated that the stored quantity is a "representation" of the synchronization word. More particularly, and for computational reasons Storage register 24 stores a representation of the integer number L of bit groups taken from the incoming TDMA bitstream, where at any one time the totality of these bit groups provide a window in the form of bit window W introduced above. More particularly, the bits in storage register 24 are shifted in from the right and also are a representation of the bits in a packet following the preamble prefix bit which completed CCR. To provide a convention for future discussion, note within register 24 that the variables $y_1$ through $Y_L$ are used for bit designation. In this regard, note that each entry $y_1$ through $y_L$ is intended to represent a bit group, where the bit group for each variable y (i.e., $y_1$, $y_2$, and so forth) includes the same integer number of bits, but where that integer may be one or a number greater than one based on the decoding operation of the receiver receiving the TDMA bitstream. The reason for this group designation arises from whether the receiver of a TDMA bitstream is either "hard" or "soft" decision based, as described immediately below.

It is known in the TDMA art that a TDMA bitstream is transmitted using pulse shaping, where each transmitted bit is sent via an analog synch pulse. Typically, such a synch pulse has a considerable amplitude peak (either positive or negative for either a binary 1 or 0, respectively) but is both preceded and followed by lesser amplitude variations. A receiver receiving each such pulse samples the analog signal and based on its timing recover measures a sample at the expected location of the peak of the pulse. Moreover, this same, through filtering and analog-to-digital conversion, produces an integer number K bits. Thus, for an example where K equals eight, then a given synch pulse is represented by an eight-bit number having a value between −128 and 127. For known "soft decision based receivers", they continue to process each K bit group, thereby increasing complexity but typically also increasing accuracy. Accordingly, for the bit group convention $y_N$ used above, each bit group $y_N$ in a soft decision based receiver includes K bits. In contrast, for known "hard decision based receivers", they reduce each K bit group to a single bit. For example, a typical approach is that a value of K greater than 0 is believed to represent an incoming binary 1 and, thus, additional analysis by the receiver is performed using a single bit in the group $y_N$ equal to 1, while if the value of K is less than or equal to 0, it is believed to represent an incoming binary 0 and, thus, additional analysis by the receiver is performed using a single bit in the group $y_N$ equal to 0.

Given the preceding, note that the present embodiments have equal applicability to both hard and soft decision receivers, and indeed may apply to other types of receivers as will be ascertainable by one skilled in the art. In any event, as introduced above, it should now be appreciated that a bit group for either approach is represented in this document by $y_N$, and that group may have one or more bits.

Nevertheless, to simplify the remaining discussion and examples, but without limiting the present inventive scope, a hard decision based receiver approach is assumed, thereby providing a single bit for each value $y_N$. Given that example, the discussion below refers to L bits as is the case where each bit group has only a single bit, but it should be understood from the preceding that a soft decision based receiver will contemplate L*K bits. Returning then to $y_1$ through $y_L$, and given the convention of these subscripts, note then that each time the bits in storage register 24 shift once to the left, then each subscript is incremented. For example, after a first such shift, then storage register 24 will store bits $y_2$ through $y_{L+1}$. This point is made here to facilitate an understanding of an Equation set forth below which demonstrates the operation of system 20. Note once again that the bits in storage register 24 are a representation in the same sense as described above with respect to storage register 22. In other words, once again a substitution is made whereby an actual logical bit of "0" is represented by a −1 while a logical bit of "1" is represented by a +1. Thus, once again by way of example, Table 2 below shows the integer L number (i.e., 16) of actual bits from FIGS. 4a–c which follow after CCR is complete as well as the representation of those bits as stored in register 24:

shifted into the farthest right location of storage register 24. Thus, this operation achieves a shifting of a bit window W from left to right across the bits in the TDMA bitstream following the bit which completed the CCR operation. To further facilitate an understanding of these operations, an alternative depiction is shown in FIG. 6, as described below.

Figures 6, 7:
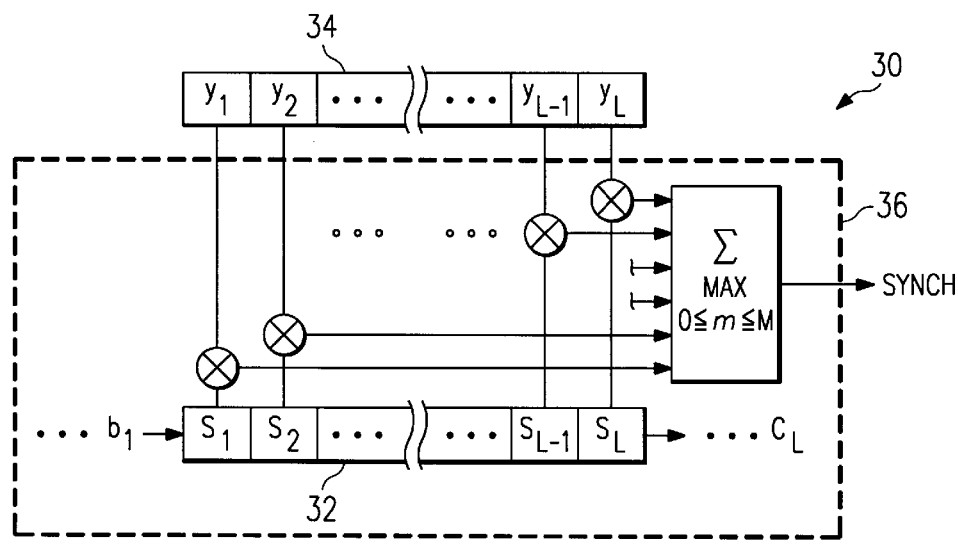
FIG. 6 illustrates an example of the bits which are compared according to the system of FIG. 5 over a total of five successive shifts of the bit window.
FIG. 7 illustrates a first inventive embodiment for comparing bits in a test pattern vector to corresponding bits in an incoming bitstream, where the test pattern vector includes only the synchronization word for a first comparison and for each successive comparison the test pattern vector adds a bit of the preamble prefix and removes a bit of the synchronization word.

FIG. 6 provides an alternative illustration of the bits at issue, as well as the iterative operation for successive increments of $\hat{m}$. The top row of FIG. 6 illustrates, from the information of FIGS. 3 and 4a, the actual bitstream which follows the preamble prefix bit which completed CCR. Thus, in the current example, the bitstream includes the last four bits of the preamble prefix, followed next by the twelve synchronization word bits. Continuing downward in FIG. 6, the second row illustrates the representation of the top row bits according to the technique introduced above. The remaining five rows in FIG. 6 each provide an instance of the operation of bit window W as it moves along the values of the top row of FIG. 6. Each of these instances is described below.

Looking to the third row of FIG. 6, it illustrates the location of window W for a first analysis of Equation 1, that is, where $\hat{m}=0$. Recall that $\hat{m}$ is the predicted value of the m

TABLE 2

| Binary representation of synchronization word | 0 | 1 | 0 | 1 | 1 | 1 | 1 | 1 | 0 | 0 | 1 | 1 | 1 | 0 | 0 | 1 |
|---|---|---|---|---|---|---|---|---|---|---|---|---|---|---|---|---|
| Representation value stored in register 22 | −1 | +1 | −1 | +1 | +1 | +1 | +1 | +1 | −1 | −1 | +1 | +1 | +1 | −1 | −1 | +1 |

System 20 further includes a calculation circuit 26 which includes sufficient circuitry to accomplish multiplication and comparison operations as appreciated from the following discussion. One skilled in the art should appreciate that such functionality, and hence such circuitry, may be accomplished by various circuits. In any event, given the bit sequences stored in registers 22 and 24, the additional functionality of calculation circuit 26 permits successive comparison operations where a bit window W is defined during each operation, and where the window for each such operation encloses L bits. Two techniques which both use such operations are described immediately below.

A first technique which may be achieved by system 20 detects a synchronization word once a threshold is reached based on the comparison of system 20. More particularly, this technique may be stated according to the following Equation 1:

$$\sum_{i=1}^{L} y_{(i+\hat{m})} c_i \geq \tau \qquad \text{Equation 1}$$

where the variables not already-defined are:

$\hat{m}$ is the predicted value of the in remaining preamble prefix bits following the preamble prefix bit which completed CCR, and where $0 < \hat{m} < M$; and $\tau$ is a threshold established as discussed below. The details of the application of Equation 1 are shown by way of example below. At this point, however, note as a preliminary observation that Equation 1 repeats for each value of it until the threshold $\tau$ is either reached or exceeded. Each repetition corresponds to a shift in the bits in storage register 24 by one bit to the left, that is, the farthest left bit is shifted out of storage register 24 while the next bit in the incoming TDMA bitstream is remaining preamble prefix bits which follow the preamble prefix bit which completed CCR. Thus, the location of the window in the third row of FIG. 6 is based on a prediction that there are no remaining preamble bits after the bit which completed CCR (i.e., in $\hat{m}=0$). In this case, the prediction is that the next bit after the bit which completed CCR is the first bit in the synchronization word. The application of Equation 1 acts to derive of measure of this prediction. Specifically, in this instance, Equation 1 reads as shown below in Equation 1.1:

$$\sum_{i=1}^{L} y_{(i)} c_i \geq \tau \qquad \text{Equation 1.1}$$

According to Equation 1.1, each bit representation of the incoming bitstream $y_i$ is multiplied times a corresponding bit representation $c_i$ in the synchronization word for all L bits in the synchronization word, and the result is totaled and compared to $\tau$. To further appreciate this multiplication, under bit window W in the third row of FIG. 6 is shown the synchronization word which is stored, by a representation, in storage register 22 of FIG. 5. Note from the third row of FIG. 6, therefore, that each product of $y_i c_i$ results in either −1 or +1. More particularly, if a given pair of $y_i$ and $c_i$ are the same, the product for that pair is +1 whereas if the given pair of $y_i$ and $c_i$ are different, the product for that pair is −1. Thus, Equation 1 (or 1.1 in the current example), in effect, performs a comparison of each bit pair $y_i$ and $c_i$ as determined by the product of the pair. Moreover, by summing each of these products, the final result is between −L and +L. In this regard, for a relatively large number of matches between each $y_i$ and $c_i$, the result of Equation 1 tends toward +L. Conversely, for a relatively large number of mis-matches between each $y_i$ and $c_i$, the result of Equation 1 tends toward −L. Concluding, therefore, the larger the result of Equation 1, the more likely that $y_i$ through $y_L$ matches $c_i$ through $c_L$, respectively. At this point, assume that $\tau=L$ and, hence, $\tau=12$. Thus, given the actual values shown in the third row of FIG. 6, one skilled in the art may confirm that Equation 1.1 yields:

$$\sum_{i=1}^{12} y_{(i)} c_i = 0 \text{ (result)} \quad \text{Equation 1.1}$$

Thus, the result of 0 is less than $\tau=12$. Note further that the low result of Equation 1.1 suggests that the $\hat{m}=0$ prediction was inaccurate, that is, the next bit following the bit which concluded CCR was determined not to be the first bit of the synchronization word. Consequently, the process repeats for the next iteration of $\hat{m}$, as discussed immediately below.

Looking to the fourth row of FIG. 6, it illustrates the location of bit window W for a second analysis of Equation 1, that is, where $\hat{m}=1$. Thus, the fourth row of FIG. 6 is based on a prediction that there is one preamble prefix bit after the bit which completed CCR; in other words, for $\hat{m}=1$ it is predicted that there is one additional preamble prefix bit, and after that additional bit is the first bit in the synchronization word. The application of Equation 1 once again acts to derive of measure of this prediction, and reads as shown below as Equation 1.2:

$$\sum_{i=1}^{L} y_{(i+1)} c_i \geq \tau \quad \text{Equation 1.2}$$

From the subscript of y in Equation 1.2 one skilled in the art should now appreciate its effect in shifting the comparison analysis of the values in storage registers 22 and 24. Specifically, Equation 1.2 is accomplished by shifting the bits in storage register 24 to the left, thereby discarding the farthest left bit (i.e., the oldest bit in the stream) and shifting in from the right a new bit. Thereafter, corresponding bits of registers 22 and 24 are multiplied and the resultant products are summed with the result again compared to $\tau$. Thus, given the actual values shown in the fourth row of FIG. 6, one skilled in the art may confirm that Equation 1.2 yields:

$$\sum_{i=1}^{12} y_{(i+1)} c_i = -2 \text{ (result)} \quad \text{Equation 1.2}$$

Once again, the result of −2 is less than $\tau=12$ and the low result of Equation 1.2 suggests that the $\hat{m}=1$ prediction was inaccurate. In other words, the assumption that there was one bit left in the preamble prefix before reaching the synchronization word was not the case. Consequently, yet again the process repeats for the next iteration of $\hat{m}$, as discussed immediately below.

Looking to the fifth and sixth rows of FIG. 6, one skilled in the art should now appreciate from the previous examples how these additional rows illustrate the location of bit window W for a third and fourth analysis of Equation 1, that is, where in $\hat{m}=2$ and $\hat{m}=3$, respectively. Thus, for the fifth row Equation 1 reads as shown in Equation 1.3 below and for the sixth row Equation 1 reads as shown in Equation 1.4 below:

$$\sum_{i=1}^{L} y_{(i+2)} c_i \geq \tau \quad \text{Equation 1.3}$$

$$\sum_{i=1}^{L} y_{(i+3)} c_i \geq \tau \quad \text{Equation 1.4}$$

From the subscripts of y in Equations 1.3 and 1.4, once again it should be appreciated how bit window W is shifting to include different bits in storage register 24, and how they are then compared to corresponding bits in storage register 22. In this regard, Equations 1.3 and 1.4 yield:

$$\sum_{i=1}^{12} y_{(i+2)} c_i = -4 \text{ (result)} \quad \text{Equation 1.3}$$

$$\sum_{i=1}^{12} y_{(i+3)} c_i = 4 \text{ (result)} \quad \text{Equation 1.4}$$

For both Equations 1.3 and 1.4, the corresponding results are less than $\tau=12$, thereby suggesting that predictions of $\hat{m}=2$ or $\hat{m}=3$ are inaccurate. As still another iteration, therefore, the process repeats for a value of $\hat{m}=4$ which, as shown below, ends the analysis of Equation 1 for the current example.

Looking to the seventh row of FIG. 6, its location of bit window W represents the instance where $\hat{m}=4$. Before reaching the actions of Equation 1 in this context, note that each bit $y_i$ in bit window W now matches each corresponding bit $c_i$ of the synchronization word (as seen by comparing the top and bottom entries of the seventh row). Now from a mathematical perspective, the application of Equation 1 to locate bit window W as shown in the seventh row yields the following Equation 1.5:

$$\sum_{i=1}^{L} y_{(i+4)} c_i \geq \tau \quad \text{Equation 1.5}$$

Consequently, Equation 1.5 yields:

$$\sum_{i=1}^{12} y_{(i+4)} c_i = 12 \text{ (result)} \quad \text{Equation 1.5}$$

As anticipated from the seventh row since each entry in bit window W matches a corresponding bit of the representation of the synchronization word, Equation 1.5 produces a result equal to $\tau$, that is, equal to 12. In other words, it is now determined that the prediction of $\hat{m}=4$ is accurate. Accordingly, there were four bits (i.e., $\hat{m}=4$) left in the preamble prefix once CCR was complete, after which was located the synchronization word. Thus, once the iteration of Equation 1.5 is complete, then the prior art process has identified the synchronization word. As a result, it may determine the location of the end of that word, thereby further defining the beginning and end of the remaining portions of the TDMA packet.

Having presented one prior art technique for synchronization word detection, the reader is now directed to a discussion of the threshold of Equation 1 as represented by $\tau$. Specifically, the preceding example illustrates that Equation 1 reaches a maximum value at the point in which bit window W encloses bits which match the synchronization word. Moreover, the above demonstrates that the maximum result of Equation 1 equals L (i.e., the number of bits in the synchronization word). In other words, at this maximized point, each product $y_i c_i$ equals one, and the sum of each L products therefore necessarily equals L. Given this conclusion, note that in an ideal situation $\tau$ would be set to L and the synchronization word would be accurately detected in each circumstance. However, as discussed below, the effect of noise prevents such an ideal result in current practical implementations.

As each bit is received in the incoming TDMA bitstream, note that its amplitude may be affected by an additional noise signal. Consequently, this noise may cause the binary value of each such bit to be misinterpreted. In the case of the representation technique mentioned above, therefore, a binary 0 which is tainted by noise may be erroneously represented as a +1 rather than a −1. Similarly, a binary 1 which is tainted by noise may be erroneously represented as a −1 rather than a +1. If such an erroneous representation occurs, then the result of Equation 1 will not reach L. Thus, the addition of noise increases the complexity of the considerations for synchronization word detection. One approach to accommodate this noise effect is to use the system described above with respect to Equation 1, but to set $\tau$ to some level lower than L, with the difference therefore taking into account this noise contribution. By reducing $\tau$, however, the accuracy of the Equation 1 approach is reduced. Other approaches to compensate for this noise effect are also presented below. Such approaches may provide better results, but for various reasons provide drawbacks as well.

One approach to compensate for the above-described noise effect is to increase the power requirements of transmitter TR. In other words, by amplifying the transmission signal, the signal-to-noise ratio ("SNR") of the received signal is reduced, assuming the noise is not amplified to a comparable level. Under such an approach, ideally the amplitude of each transmitted bit is raised to a level to sufficiently overwhelm any contribution of an added noise signal. Consequently, any receiver of the signal properly interprets each incoming bit during synchronization word detection. Thus, $\tau$ may be set at or near L with a fair amount of confidence in the accuracy of the ability to detect an incoming synchronization word. While this technique may further enhance the effectiveness of Equation 1, it also provides drawbacks. For example, it is often the case that power requirements are limited for various reasons. Thus, a technique which seeks to raise those power requirements may not be acceptable. Even if deemed acceptable, such a technique may not be considered efficient. For example, the added power requirements may affect other considerations in the design. Still other examples will be ascertainable by one skilled in the art.

Another approach to compensate for the above-described noise effect is to modify Equation 1 in a manner which eliminates the threshold value $\tau$. This alternative approach repeats iterations of the calculations of Equation 1 and, after all calculations are complete, determines that the synchronization word was encompassed within a window W for the iteration of the Equation which provided the maximum result. Mathematically stated, this alternative is represented by the following Equation 2:

$$\max_{0 \leq \hat{m} \leq M} \left\{ \sum_{i=1}^{L} y_{(i+\hat{m})} c_i \right\} \qquad \text{Equation 2}$$

Equation 2 indicates that, for each value of $\hat{m}$ between 0 and M (i.e., for M+1 iterations), the summation is performed with each summation being of L products of $y_{(i+\hat{m})} c_i$. Moreover, the preceding "max" indication is included to indicate that Equation 2 is solved by selecting the one of the M+1 summations which provides the maximum result. An example of Equation 2 may be appreciated from once again considering the illustration of FIG. 6, and by assuming that M=4. In that case, one skilled in the art will appreciate that the M+1 iterations of Equation 2 will produce the same results shown from Equations 1.1 through 1.5 (i.e., 0, −2, −4, 4, and 12, respectively). Next, the maximizing aspect of Equation 2 then provides that the result of 12 is selected, that is, the synchronization word is detected for the value of $\hat{m}$=4. However, note that in actuality the implementation of Equation 2 is likely to require that M may be larger than four. In such a case, one skilled in the art will appreciate that additional iterations of Equation 2 beyond M=4 produce results lower than 12. In other words, with such additional iterations, the result of 12 is still the maximum result, and thus the final operation with respect to Equation 2 is to choose that value of $\hat{m}$ which produced that maximum result (i.e., $\hat{m}$=4).

While the approach of Equation 2 detects a synchronization word in a manner to alleviate the noise effects described above, note that it also provides certain drawbacks. For example, the approach of Equation 2 requires iterations over the entire range of zero through M. In contrast, recall that the approach of Equation 1 stops once the threshold $\tau$ is reached and, therefore, may reach its result sooner. In other words, the Equation 2 technique requires a greater delay before it reaches its determination. In addition, to accomplish the entire analysis over all iterations for Equation 2, there must be some technique directed to saving the history over all iterations, so that the iteration corresponding to the maximum result may be identified from that history. This history requirement may be considered a drawback in some situations as it may increase circuit and processing demands.

As a final prior art approach, Mr. Massey derived the following Equation 3 as a technique for synchronization word detection which utilizes the same sliding bit window approach described above, but further compensations for noise effects as described below:

$$\max_{0 \leq \hat{m} \leq M} \left\{ \sum_{i=1}^{L} y_{(i+\hat{m})} c_i - \sum_{j=1}^{L} \ln(\cosh(y_{(j+\hat{m})}/\sigma^2)) \right\} \qquad \text{Equation 3}$$

where, y, c, and L are the same as defined for the earlier approaches; and $\sigma$ is the normalized variance of additive Gaussian noise signal in the incoming TDMA stream. Intuitively, the larger the SNR, the smaller the value of $\sigma$.

Equation 3 has been shown in the art to provide improved results over the approaches of Equations 1 and 2. However, it too has drawbacks. For example, note that Equation 3 requires an additional value of variance (i.e., $\sigma$) and further requires a hyberbolic cosine evaluation given the effect of that variance. As a practical matter, therefore, this variance must be determined, and ideally is constantly updated as TDMA communications occur. Naturally, therefore, and as known in the art, there is considerable extra complexity involved due to these requirements. Given these drawbacks as well as the various considerations set forth above, the present inventor provides below improved embodiments which achieve results which in efficiency either exceed or approximate those of the above-discussed prior art, and which may be implemented in manners which are less complex as compared to the corresponding prior art technique which achieves comparable or even less efficient results.

Having detailed the prior art, the discussion now turns to the preferred embodiments. In this regard, FIG. 7 illustrates a system 30 which also is implemented in a combination of hardware and software to detect a synchronization word. At first glance, system 30 may appear in certain respects comparable to system 20 of the prior art. However, the remainder of this document demonstrates considerable differences in both methodology and results. Turning to system 30, it is preferably implemented in each of receivers RCVR1 through RCVRN of system 10 of FIG. 1, thereby permitting TDMA communication and, more specifically, permitting detection of synchronization words in the TDMA binary stream of information. The details of its apparatus and methodology are presented below. Moreover, from those details, one skilled in the art will appreciate that system 30 may be constructed using various circuits, including integrated circuits such as an application specific integrated circuit ("ASIC"), a digital signal processor ("DSP"), or the like.

System 30 includes two storage registers 32 and 34. Storage registers 32 and 34 represent hardware capable of storing representations of the binary signals described below, and thus may be implemented using various different types of circuit storage devices such as memory or register space in an integrated circuit. Each of these registers is discussed below.

Storage register 32 stores a representation of a test pattern vector S which is compared against bits in the incoming TDMA bitstream as appreciated below. Note that once again it is stated that the register stores a representation, and this terminology is intended to indicate the same +1 and −1 format is used, as substituted for a binary 1 and 0, respectively, as introduced earlier. Note also that to detect a synchronization word, system 30 performs M+1 comparisons using a test pattern in storage register 32, and that test pattern changes for each of those comparisons. As appreciated below, each comparison is with the representation stored in storage register 34. Thus, as in one prior art approach described above, these comparisons correspond to the instances of $0 \leq \hat{m} \leq M$. By way of introduction, for the first of these repeated comparisons, the test pattern vector S is the same as the vector C, that is, for each value of i from 1 through L, $s_i = c_i$. In this regard, note that in FIG. 7, storage register 32 stores L bits. In addition, however, for additional repetitions, the test pattern vector S changes and no longer equals the synchronization word vector C. This adjustment to vector S represents a key improvement discovered by the present inventor, and also provides a key distinction between the preferred embodiments and the above-described prior art.

After the preamble prefix bit which completes CCR is encountered, then the goal of the preferred embodiments is to detect the synchronization word. However, in this endeavor, there are between 0 and M bits remaining of the preamble prefix before the synchronization word (i.e., vector C) is encountered. Let these preamble prefix bits be defined by the vector B as in Equation 4 below:

$$B = \{b_M, b_{m-1}, b_{M-2}, \ldots, b_2, b_1\} \qquad \text{Equation 4}$$

Recall that the preamble prefix bits are a sequence of bits which, for a given system, alternate in some known manner. As recognized by the present inventor, however, the prior art techniques described above discard the known information provided by these bits when detecting a synchronization word. In sharp contrast, and as detailed below, the inventive embodiments presented in this document use this information to achieve efficient and improved synchronization word detection. In this regard, and returning to the definition of the test pattern vector S as stored in storage register 32, vector S is now defined as a pattern which changes for successive iterations of the technique performed by system 30. Particularly, when detecting an incoming synchronization word, vector S is altered for each iteration to include a portion of the vector B concatenated with either a portion or all of the synchronization word vector C. Concatenation with a portion of the synchronization word vector C is described here, with an explanation of the latter concatenation deferred until later. Thus, at this point, the successive vectors for S are defined as $S^0$ through $S^M$ (where the superscript terms are merely to distinguish one vector S from another, but are not intended to demonstrate an exponent function). Specifically, $S^0$ through $S^M$ are defined by the following Equations 5.1 through 5.5:

$$S^0 = (s_1^0, s_2^0, \ldots, s_L^0) = (c_1, c_2, \ldots, c_{L-1}, c_L) \qquad \text{Equation 5.1}$$

$$S^1 = (s_1^1, s_2^1, \ldots, s_L^1) = (b_1, c_1, \ldots, C_{L-2}, C_{L-1}) \qquad \text{Equation 5.2}$$

$$S^2 = (s_1^2, s_2^2, \ldots, s_L^2) = (b_2, b_1, c_1, \ldots, c_{L-3}, c_{L-2}) \qquad \text{Equation 5.3}$$

$$S^{M-1} = (s_1^{M-1}, s_2^{M-1}, \ldots, s_L^{M-1}) = (b_{m-1}, b_{m-2}, \ldots, b_1, c_1, \ldots, c_{L-(M-)-1}, c_{L-(M-1)}) \qquad \text{Equation 5.4}$$

$$S^M = (s_1^M, s_2^M, \ldots, S_L^M) = (b_M, b_{M-1}, \ldots, b_1, c_1, \ldots, c_{L-(M)-1}, c_{L-(M)}) \qquad \text{Equation 5.5}$$

Given Equations 5.1 through 5.5, as well as the illustration of FIG. 7, one skilled in the art should appreciate now that storage register 32, for the first comparison of $\hat{m} = 0$, stores the synchronization word vector C. For each subsequent comparison, storage register 32 shifts one bit of the synchronization word vector C out to the right and shifts in from the left the next bit b of the preamble prefix vector B. Thus, as appreciated below and unlike the prior art, in the preferred inventive embodiments the preamble prefix bits which follow that bit which completed CCR are used for detecting the synchronization word.

Turning now to storage register 34, it stores a representation of the L bits sampled from the incoming TDMA bitstream which follow the preamble prefix bit which completed CCR. First, note yet again that the stored information is a representation, meaning it implements the format of +1 and −1 for a binary 1 and 0, respectively. Second, note that these bits are not shifted, unlike the prior art techniques described above. Thus, to the extent a window is defined so that its left most bit is that bit which follows the bit which completed CCR, for a complete synchronization word detection that bit as well as those to its right remain unchanged. In other words, unlike the prior art, the left most bit in storage register 34 is not shifted to the left and out of the register. Thus, to the far left of storage register is shown bit $y_1$, and it does not shift as was the case in the prior art. To the far right of storage register is bit $y_L$, and it too does not shift. Note that the number of bits in storage register 34 are increased beyond $y_L$, for an embodiment described later but in both the presently described embodiment as well as that described later there is not a shifting out of bits to the left of storage register 34.

System 30 further includes a calculation circuit 36 which includes sufficient circuitry to accomplish multiplication and comparison operations as appreciated from the following discussion. Once more, one skilled in the art should appreciate that such functionality, and hence such circuitry, may be accomplished by various circuits such as an ASIC or a DSP. In any event, given the bit sequences stored in registers 32 and 34, the additional functionality of calculation circuit 36 permits successive comparison operations where the bits in storage register 34 are effectively compared against a test pattern vector S in storage register 32 which changes for each comparison. More particularly, this technique may be stated according to the following Equation 6:

$$\max_{0 \leq \hat{m} \leq M} \left\{ \sum_{i=1}^{L} y_{(i)} s_i^{\hat{m}} \right\} \quad \text{Equation 6}$$

The details of the application of Equation 6 are shown by way of example below. At this point, note that Equation 6 repeats for all values of $\hat{m}$ and the solution is that iteration which presents the maximum result. Each repetition after the first corresponds to a shift in the test pattern vector S in storage register 32. Given how vector S is defined above, each such shift is one bit to the right, that is, the farthest right bit of the synchronization word vector C is shifted out of storage register 32 while the next bit in the prefix preamble vector B is shifted into the farthest left location of storage register 32. To further facilitate an understanding of these operations, an alternative depiction is shown in FIG. 8, as described below.

Figures 8, 9:
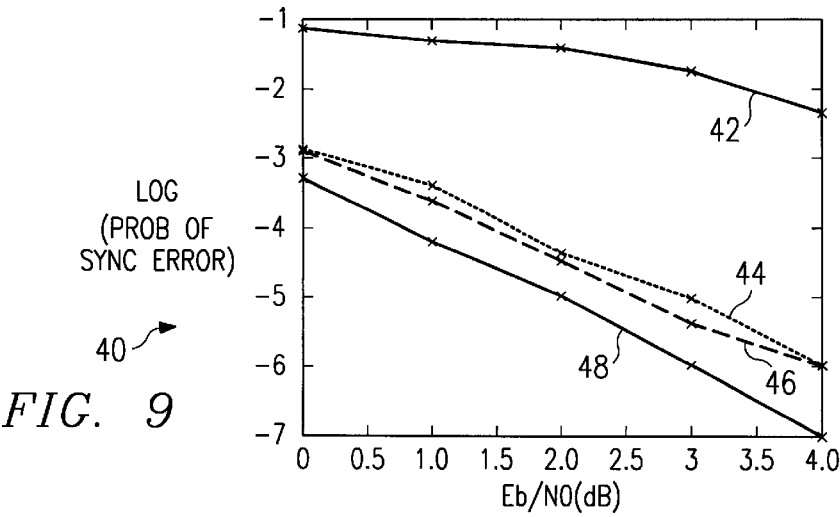
FIG. 8 illustrates an example of the bits which are compared according to the system of FIG. 7 over a total of seven successive comparisons.
FIG. 9 illustrates a graph of the results of two prior art approaches and two of the present inventive embodiments.

FIG. 8 provides an illustration of the successive operations for successive steps of incrementing $\hat{m}$ to implement Equation 6 using system 30. The top two rows of FIG. 8 are the same information as FIG. 6, and thus illustrates the bitstream which follows the CCR determination and its +1 or −1 representation, respectively. The remaining seven rows in FIG. 8 provide instances of the shifting of vector S bits through storage register 32. Each of these instances is described below.

Looking to the third row of FIG. 8, it first illustrates the fixed bits in storage register 34, and underneath those bits are shown the test pattern vector S in storage register 32, both as they exist for the first iteration of Equation 6 (i.e., $\hat{m}=0$). Since $\hat{m}=0$, then this first instance corresponds to a prediction that there are no remaining preamble bits after the bit which completed CCR. The application of Equation 6 acts to derive of measure of this prediction, with the result as shown in Equation 6.1 below:

$$\sum_{i=1}^{L} y_{(i)} s_i^0 = 2 \text{ (result for } \hat{m} = 0) \quad \text{Equation 6.1}$$

According to Equation 6.1, for the length L (e.g., 12) of the synchronization word, each bit representation of the incoming stream $y_i$ is multiplied times a corresponding bit representation $s_i$ in the test pattern vector S, where for $\hat{m}=0$ that vector is the same as the synchronization word vector C. Thus, given the actual values shown in the third row of FIG. 8, one skilled in the art may confirm the result shown in Equation 6.1.

Since Equation 6 repeats to determine a maximum over M+1 results, then the remaining illustrations of FIG. 8 (i.e., rows 4 through 9) depict each of those instances. For purposes of the present example, note that M is assumed to be six, thereby giving rise to the total of seven different scenarios illustrated in FIG. 8. Despite this example value, however, note that the value of M is typically taken to be one-half less than the length of the synchronization word and may differ based on various considerations. In any event, looking to rows 4 through 9 of FIG. 8, one skilled in the art may confirm that Equation 6 then repeats for $\hat{m}=1$ through $\hat{m}=6$. Moreover, such a skilled person may confirm that shown in the following Table 3:

TABLE 3

| $\hat{m}$ | Equation 6 result |
|---|---|
| 1 | −4 |
| 2 | 0 |
| 3 | 2 |
| 4 | 12 |
| 5 | 0 |
| 6 | 2 |

Having determined the values in Table 3, the solution to Equation 6 is completed by identifying that value of $\hat{m}$ which produced the highest result. Given the results of Table 3, the entry corresponding to $\hat{m}=4$ produces this solution, and thus, system 30 determines that the synchronization word was received after receiving four preamble prefix bits which followed the preamble prefix bit which completed CCR.

Having demonstrated the operation of one of the present inventive embodiments, FIG. 9 illustrates a graph 40 demostrating the efficiency of its operation as compared to other alternatives. Specifically, graph 40 demonstrates the results of Monte Carlo simulations to evaluate the error performance on a TDMA bitstream using a synchronization word and preamble bits as would be encountered in the DECT standard. The example used to obtain graph 40 implemented a synchronization word having 16 bits (i.e., L=16) as follows: 1110100110001010101. Thus, the representation for this synchronization word, using the −1/+1 substitution technique described above, yields the following sequence: 1, 1, 1, −1, 1, −1, −1, 1, 1, −1, −1, −1, 1, −1, 1, −1. Further, the preamble prefix pattern is {1, −1} and the value of M implemented was for M=8. Given these test criteria, the results of graph 40 are discussed below.

Before discussing the specific plots of graph 40, note also its axes. In the vertical dimension of graph 40 is the logarithm of the probability that a synchronization error occurred. In the horizontal dimension of graph 40 is a measure of signal-to-noise ratio ("SNR"), that is, Eb represents the energy of each bit while NO represents the noise energy in the signal. Thus, the ratio represents a power measurement. Turning to the specific results of graph 40, plot 42 illustrates the results of the simulation using the technique characterized by the prior art Equation 1, above. Plot 46 of graph 40 illustrates the results of the prior art Massey criteron described above, and as characterized by Equation 3. Thus one skilled in the art will appreciate the improved results of plot 46 over plot 42, that is, at an SNR of 4 dB, the Massey criteria produces approximately a 3.5 drop in the log of the probability of synchronization error (i.e., from −2.5 to −6). Note additionally, however, that plot 44 of graph 40 illustrates the results of the inventive embodiment described above with respect to FIGS. 7 and 8, and characterized by Equation 6. Thus, graph 40 demonstrates that the inventive embodiment produces a virtually identical plot to the Massey approach, where the inventive embodiment benefits from including an analysis of some of the preamble prefix bits in its methodology. In addition, the results of the inventive embodiment are achieved without various of the additional complexities arising from the Massey approach, where those complexities were described above. In overall efficiency, therefore, the embodiment described thus far may prove far more suitable for various practical implementations.

In addition to the plots described above, note that graph 40 includes a fourth plot 48. In this regard, note that the methodology of utilizing some of the preamble prefix bits in synchronization word detection, as demonstrated by the inventive embodiment set forth above, also provides for alternative inventive embodiments. In this context, plot 48 demonstrates the results of yet another embodiment contemplated within the current inventive scope. This other embodiment may be appreciated both in the context already provided, and further through a mathematical demonstration as is provided below. Before reaching that discussion, note at the outset that this other embodiment provides a further improved result over the Massey (and other prior art) approach. Indeed, by tracing plot 48, one skilled in the art will appreciate that the improvement measures approximately 1 dB over the entire range of samples shown in graph 40. This alternative, therefore, may be preferred in various contexts, although it does present additional complexities as will be appreciated from the following discussion.

Introducing a distinction between the following inventive embodiment and the one described above, let us now look to an alternative definition of the vector S which, recall, is the test sample pattern used for comparison with the incoming TDMA bitstream. Specifically, recall in connection with the introduction to Equations 5.1 through 5.5 that it was stated that vector S is altered for each iteration to include a portion of the vector B concatenated with either a portion or all of the synchronization word vector C. The earlier discussion presented the former instance where the concatenation was only with a portion of the synchronization word vector. Note now, however, than an alternative inventive embodiment is obtained by concatenating the same portion of B (i.e., those bits which follow the preamble prefix bit which completed CCR) with the entire synchronization word vector C. Thus, for this alternative embodiment, the successive vectors $S^0$ through $S^M$ for vector S are defined by the following Equations 6.1 through 6.5:

$$S^0 = (s_1^0, s_2^0, \ldots, s_L^0) = (c_1, c_2, \ldots, c_{L-1}, c_L) \quad \text{Equation 6.1}$$

$$S^1 = (s_1^1, s_2^1, \ldots, s_L^1, s_{L+1}^1) = (b_1, c_1, \ldots, c_{L-1}, c_L) \quad \text{Equation 6.2}$$

$$s^2 = (s_1^2, s_2^2, \ldots, s_{L+1}^2, s_{L+2}^2) = (b_2, b_1, c_1, \ldots, c_{L-1}, c_L) \quad \text{Equation 6.3}$$

$$S^{M-1} = (s_1^{M-1}, s_2^{M-1}, \ldots, s_{L+M-2}^{M-1}, s_{L+M-1}^{M-1}) = (b_{M-1}, b_{M-2}, \ldots, b_1, c_1, \ldots, c_{L-1}, c_L) \quad \text{Equation 6.4}$$

$$S^M = (s_1^M, s_2^M, \ldots, s_{L+M-1}^M, s_{L+M}^M) = (b_m, b_{m-1}, \ldots b_1, c_1, \ldots, c_{L-1}, c_L) \quad \text{Equation 6.5}$$

Thus, $S^i$ is a vector of dimension L+i, that is, each vector S includes the entire representation of the synchronization word vector C, and further includes i bits of the preamble prefix bits. This expanded definition arises because, at the time when CCR is just complete, the receiving unit could be next receiving any one of $S^0$ through $S^M$. Since M is defined as the number of bits in which the synchronization word is detectable, then the optimum preferred solution in terms of accuracy collects L+M data samples before determining where the synchronization word was aligned following the preamble prefix bit which completed CCR. Moreover, the bits following the first L+M samples are random and, thus, are not helpful in detecting the synchronization word.

Let $D^i$ be defined by the following Equation 7:

$$D^i = (d_1^i, d_2^i, \ldots, d_i^i) \quad \text{Equation 7}$$

where,

D is a vector of dimension i, consisting of random data, with $P(d_j=1)=P(d_j=0)=\frac{1}{2}$.

If $A=(a_1, a_2, \ldots, a_n)$ and $B=(b_1, b_2, \ldots, b_m)$, then let the vector (A,B) represent their element-wise concatenation. In other words, $(A,B)=(a_1, a_2, \ldots, a_n, b_1, b_2, \ldots, b_m)$. Then, the first L+M values at the receiver are represented by a bit sample vector $Y=(y_1, y_2, \ldots y_{L+M})$ defined by the following Equation 8:

$$Y^m = (S^m, D^{M-m}) + N \quad \text{Equation 8}$$

where, p1 m is the unknown number of preamble prefix bits before the synchronization word; and N models the additive white Gaussian noise, that is, $N=(n_1, n_2, \ldots n_{L+M})$;

$n_i \sim n(0, \sigma)$, where $n(0, \sigma)$ is a Gaussian random variable.

Upon receiving the random sample vector Y, the task of the receiver is to determine where the synchronization word lies, or equivalently, to estimate m. An optimal receiver estimates Y to be $Y_{\hat{m}}$, such that the a-posteriori probability $P(Y=Y_{\hat{m}}|Y)$ is maximized. If we assume that m is uniform over $\{0, 1, \ldots, M\}$, then the optimal receiver equivalently picks $Y_{\hat{m}}$ that maximizes $P(Y|Y_m=Y_{\hat{m}})$. This is equivalent to a maximum likelihood criterion. Thus, the following embodiment provides a receiver methodology that determines the following Equation 9:

$$\max_{0 \leq \hat{m} \leq M} \{P(Y = Y_{\hat{m}} | Y)\} \quad \text{Equation 9}$$

In view of Equation 8 then Equation 9 is the same as the following Equation 10:

$$\max_{0 \leq \hat{m} \leq M} \{P(N = Y - (S^{\hat{m}}, D^{M-\hat{m}}))\} \quad \text{Equation 10}$$

Since the random variables $n_1, n_2, \ldots n_{L+M}$ are independent, Equation 10 can be written as the following Equation 11:

$$\max_{0 \leq \hat{m} \leq M} \left\{ \prod_{i=1}^{L+\hat{m}} P(n_i = y_i - s_i^{\hat{m}}) \prod_{j=L+\hat{m}+1}^{L+M} P(n_j = y_j - d_j^{M-\hat{m}}) \right\} \quad \text{Equation 11}$$

Now, recalling that $d_j^{M-\hat{m}}$ are random representation data values of either +1 or −1, with equal probability, then Equation 12 follows:

$$P(n_j = y_j - d_j^{M-\hat{m}}) = \frac{1}{2}\{P(n_j = y_j - d_j^{M-\hat{m}} | d_j^{M-\hat{m}} = 1) + \quad \text{Equation 12}$$

$$P(n_j = y_j - d_j^{M-\hat{m}} | d_j^{M-\hat{m}} = -1)\}$$

$$= \frac{1}{2}\{P(n_j = y_j - 1) + P(n_j = y_j + 1)\}$$

Since n are $(0, \sigma)$ Gaussian random variables, $P(n=\eta)$ is the Gaussian probability density function $f(\eta)$ of Equation 13:

$$P(n = \eta) = f(\eta) = \frac{1}{\sigma\sqrt{2\pi}} e^{\frac{-\eta^2}{2\sigma^2}} \quad \text{Equation 13}$$

Substituting Equation 12 into Equation 13, yields Equation 14:

$$P(n_j = y_j - d_j^{\hat{m}}) = \frac{1}{2\sigma\sqrt{2\pi}} \left\{ e^{\frac{-(y_j-1)^2}{2\sigma^2}} + e^{\frac{-(y_j+1)^2}{2\sigma^2}} \right\} \quad \text{Equation 14}$$

$$= \frac{e^{-(y_j^2+1)/2\sigma^2}}{\sigma\sqrt{2\pi}} \left\{ \frac{e^{y_j/\sigma^2} + e^{-y_j/\sigma^2}}{2} \right\}$$

$$= \frac{e^{-(y_j^2+1)/2\sigma^2}}{\sigma\sqrt{2\pi}} \cosh(y_j/\sigma^2) =$$

Similarly, noting that $(s_i^{\hat{m}})^2 = 1$, yields the following Equation 15:

$$P(n_i = y_i - s_i^{\hat{m}}) = \left( \frac{e^{-(y_j^2+1)/2\sigma^2}}{\sigma\sqrt{2\pi}} \right) e^{\frac{y_i s_i^{\hat{m}}}{\sigma^2}} \quad \text{Equation 15}$$

Substituting Equations 14 and 15 into Equation 11 yields the following Equation 16:

$$\max_{0 \le \hat{m} \le M} \left\{ \prod_{i=1}^{L+\hat{m}} \left( \frac{e^{-(y_i^2+1)/2\sigma^2}}{\sigma\sqrt{2\pi}} \right) e^{\frac{y_i s_i^{\hat{m}}}{\sigma^2}} \right. \quad \text{Equation 16}$$

$$\left. \prod_{j=L+\hat{m}+1}^{L+M} \left( \frac{e^{-(y_j^2+1)/2\sigma^2}}{\sigma\sqrt{2\pi}} \right) \cosh(y_j/\sigma^2) \right\} =$$

$$\max_{0 \le \hat{m} \le M} \left\{ \prod_{k=1}^{L+\hat{m}} \left( \frac{e^{-(y_k^2+1)/2\sigma^2}}{\sigma\sqrt{2\pi}} \right) \left( \prod_{i=1}^{L+\hat{m}} e^{\frac{y_i s_i^{\hat{m}}}{\sigma^2}} \right) \right.$$

$$\left. \left( \prod_{j=L+\hat{m}+1}^{L+M} \cosh(y_j/\sigma^2) \right) \right\}$$

Eliminating terms independent of $\hat{m}$ and taking the logarithm, the maximum likelihood criterion of Equation 8 becomes $$\max_{0 \le \hat{m} \le M} \{ P(Y | Y_m = Y_{\hat{m}}) \} = \quad \text{Equation 17}$$

$$\max_{0 \le \hat{m} \le M} \left\{ \frac{1}{\sigma^2} \sum_{i=1}^{L+\hat{m}} y_i s_i^{\hat{m}} + \prod_{j=L+\hat{m}+1}^{L+M} \ln(\cosh(y_j/\sigma^2)) \right\}$$

Since $$\sum_{j=1}^{L+\hat{m}} \ln(\cosh(y_j/\sigma^2))$$

is independent of $\hat{m}$, it may be subtracted from the maximization on the right hand side without changing the result and thereby presents the optimal solution for the preferred embodiment as shown in the following Equation 18:

$$\max_{0 \le \hat{m} \le M} \left\{ \frac{1}{\sigma^2} \sum_{i=1}^{L+\hat{m}} y_i s_i^{\hat{m}} - \sum_{j=1}^{L+\hat{m}} \ln(\cosh(y_j/\sigma^2)) \right\} \quad \text{Equation 18}$$

Given the above presentation by the present inventor, an optimal solution embodiment for synchronization word detection is now presented to implement Equation 18 in accordance with the present inventive scope. Before proceeding with, and by way of introduction to, an example of such an embodiment, note some observations regarding the operation of Equation 18. First, note the contrast of Equation 18 to that of Massey as shown by Equation 3. For example an embodiment implementing Equation 18, through its definition of the vector S, takes into account the $\hat{m}$ known preamble prefix bits preceding the synchronization word. On the other hand, Massey ignores the preamble prefix bits. As another example, an embodiment implementing Equation 18, performs a correlation with $L+\hat{m}$ received values from the TDMA bitstream. In contrast, Masseys' criterion takes into account only the L bits of the synchronization word and further implements a sliding window across the incoming TDMA bitstream. Second, note a common aspect of Equations 18 and 3 in that both techniques implement the non-linear hyperbolic cosine element, and for each this may be looked upon as a normalization factor that accounts for random data and noise surrounding the synchronization word.

Figures 10, 11:
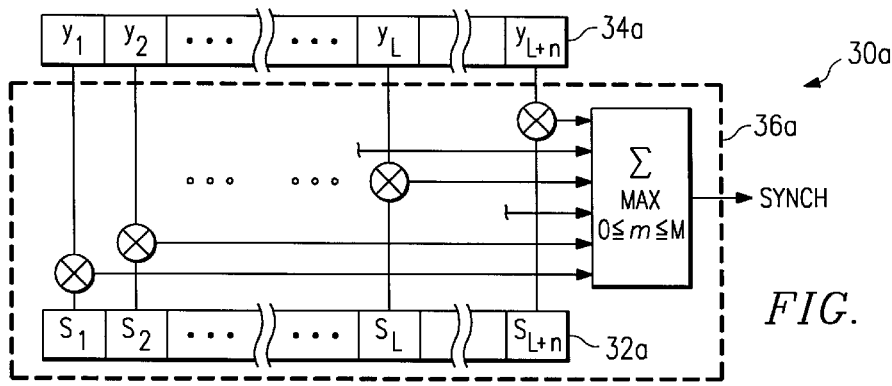
FIG. 10 illustrates a second inventive embodiment for comparing bits in a test pattern vector to corresponding bits in an incoming bitstream, where the test pattern vector includes only the synchronization word for a first comparison and for each successive comparison the test pattern vector adds a bit of the preamble prefix.
FIG. 11 illustrates an example of the bits which are compared according to the system of FIG. 10 over a total of seven successive comparisons.

FIG. 10 illustrates a system 30a which represents a modification to system 30 described as an earlier inventive embodiment in reference to FIG. 7, and which achieves the results shown by plot 48 of graph 40 of FIG. 9. In FIG. 10 the letter "a" is added to each reference identifier which was earlier used in FIG. 7. This change in each identifier is performed so that a FIG. 10 item is distinguishable from the corresponding item shown in FIG. 7, but also so that the FIG. 10 item is recognized as comparable to the FIG. 7 item in certain respects as well. Given the comparable nature of systems 30a and 30, one skilled in the art should again appreciate that system 30a may be implemented in a variety of configurations which likely include a combination of hardware and software to detect a synchronization word. Moreover, such a system is preferably implemented in each of receivers RCVR1 through RCVRN of system 10 of FIG. 1, thereby permitting TDMA communication and, more specifically, permitting detection of synchronization words in the TDMA binary stream of information.

Looking to system 30a, it includes a storage register 32a for storing a representation (i.e., +1 or −1 per bit) of the test pattern vector S to be used for comparison against bits in the incoming TDMA binary bitstream. With respect to storage register 32a, first note again that the present embodiments contemplate using the preamble prefix bits which follow CCR as part of the methodology for synchronization word detection. Second, recall that storage register 32 of FIG. 7 operates such that for a first comparison, it stores each of the L bits in the synchronization word vector C and, after that first comparison, each successive comparison shifts one of the preamble prefix bits in to the left of the register. Similarly, therefore, note that storage register 32a operates in this same respect, that is, such that the synchronization word vector C is left justified within storage register 32a for the first comparison and thereafter shifts to the right for each successive comparison while also shifting in from the left an additional bit from the preamble prefix (i.e., vector B). Given this commonalty between registers 32a and 32, note now the difference between the two. Specifically, recall that storage register 32, when shifting vector B in to the left of the register, also concurrently shifts one of the synchronization word bits out of the right end of the register. In other words, storage register 32 maintains only L bits in storage for each comparison. In contrast, note now that each of the L bits of the synchronization word vector C are shifted to the right in storage register 32a, and remain in that register for all L+M iterations of Equation 18. In other words, for the first iteration (i.e., m̂=0), then storage register 32a stores only L bits and those are the synchronization word vector C; however, for each remaining iteration up to the L+M iterations, an additional bit from the preamble prefix is added from the left and, thus, to the end of the already stored bits. Thus, for the final iteration of Equation 18, storage register 32a stores vector $S^M$, which as defined in Equation 6.5 above includes the entire synchronization word vector C as well as M of the preamble prefix bits concatenated to the right of that vector C.

Looking to register 34a, note that it may store up to L+M bits in contrast to the L bits stored by register 34. These additional bits should be appreciated given the function that it is compared to the expanded definition of vector S stored in register 32a as discussed above. Thus, like register 32a, the actual number of bits in storage register 34a changes for each of the iterations of Equation 18. For example, for the first iteration (i.e., m̂=0), storage register 34a stores only L bits of the incoming TDMA bitstream, with the farthest left bit representing the first bit following the preamble prefix bit which completed CCR. For each remaining iteration up to the L+M iterations, an additional bit from the incoming TDMA bitstream is added, from the right, to the end of the already stored bits.

Lastly with respect to system 30a, note that it includes a calculation circuit 36a which includes sufficient circuitry to accomplish multiplication and comparison operations as appreciated from Equation 18 as well as the following discussion. Again, such functionality, and hence such circuitry, may be accomplished by an ASIC, DSP, or the like. In any event, given the bit sequences stored in registers 32a and 34a, the additional functionality of calculation circuit 36a permits successive comparison operations by multiplying and summing the bits in storage registers 32a and 34a, including the functionality to comprehend that those register values increase by one bit for each successive comparison. Additionally, it is contemplated that calculation circuit 36a has sufficient storage capability to perform the computations involving σ as set forth in Equation 18, to store the results of each of the L+M iterations, and to select the maximum from those results. In completing this process, once again that maximum corresponds to that value of m̂ which therefore indicates detection of the synchronization word in the incoming TDMA bitstream.

FIG. 11 provides an illustration of the successive operations for successive steps of incrementing m̂ to implement Equation 18 using system 30a. The top two rows of FIG. 11 include the same information as the same rows of FIG. 8, and thus illustrate the actual bitstream which follows the CCR determination and its +1 or −1 representation, respectively. In addition, however, note that two random data bits which follow the synchronization word are also shown in these top two rows to facilitate the example shown below. The remaining seven rows in FIG. 11 provide instances of the shifting of additional bits into storage registers 32a and 34a. Each of these instances is described below.

Looking to the third row (from the top) of FIG. 11, it first illustrates the fixed L+M bits in storage register 34a. Underneath those bits are the corresponding test pattern bits from vector S in storage register 32a. Thus, the illustrations of this third row demonstrate the location of the bits to be compared for the first iteration of Equation 18 (i.e., m̂=0). Again, since m̂=0, then this first instance corresponds to a prediction that there are no remaining preamble bits after the bit which completed CCR. The application of Equation 18 acts to derive of measure of this prediction, and given m̂=0 may be solved by completing the following Equation 18.1:

$$\max_{0 \le \hat{m} \le M} \left\{ \frac{1}{\sigma^2} \sum_{i=1}^{L+0} y_i s_i^0 - \sum_{j=1}^{L+0} \ln(\cosh(y_j/\sigma^2)) \right\}, \text{(for } \hat{m} = 0) \quad \text{Equation 18.1}$$

According to the first summation of Equation 18.1, each of the L bits in storage registers 32a and 34a are multiplied times one another and the products are summed. Moreover, the second summation of Equation 1 subtracts a normalization from the first summation, where the normalization is based on each of the bits in storage register 34a as well as σ defined above. Thus, Equation 18.1 may be solved given these additional values, with its result then stored for purposes of later determining whether it is the maximum over all L+M samples as further appreciated below.

Since Equation 18 repeats to determine a maximum over L+M results, then the remaining illustrations of FIG. 11 (i.e., rows 4 through 9) depict each of those instances. For purposes of the present example, again M is assumed to be six, thereby giving rise to the total of seven different scenarios illustrated in FIG. 11. Thus, looking to rows 4 through 9 of FIG. 11, one skilled in the art will appreciate that each row represents a corresponding instance of the ascension from m̂=0 through m̂=6. In each instance, therefore, an additional preamble prefix bit is added to the vector S, as accomplished by a shift in to the left of storage register 32a. Once this shift occurs, the bits in storage registers 32a and 34a are again multiplied according to Equation 18, and the result is corrected by the second summation relating to σ. Concluding the analysis, once the result for each of the L+M iterations of Equation 18 are complete and stored, the synchronization word is detected by selecting the value of m̂ which corresponds to the maximum stored value (which is m̂=4 in this example).

Given the above, one skilled in the art will appreciate that system 30 of FIG. 7 and system 30a of FIG. 10 provide alternative apparatus and methodology for synchronization word detection. Having examined both alternatives, note now some observations regarding the two. As a first observation, as shown in plots 44 and 48 of graph 40 of FIG. 9, both embodiments provide results which compare favorably to the prior art. For example, both embodiments exceed the prior art threshold technique shown by plot 42. Moreover, system 30 approximates the efficiency of the prior art Massey system while system 30a exceeds the efficiency of that prior art system. As a second observation, note that system 30 effectively represents a less complex approach to that achieved by system 30a. This contrast is appreciated by comparing the operational descriptions set forth above, and also may be appreciated by comparing Equations 6 and 18. In either case, one skilled in the art will appreciate that system 30 reaches its results with two changes from system 30a. First, in comparison to system 30a, system 30 truncates the bits of the test pattern vector S so that only L bits are used. Second, in comparison to system 30a, system 30 does not perform the additional analyses involving σ. Given these observations, one skilled in the art may select either system type based on implementation considerations. In other words, the results achieved by the methodology of system 30 may be acceptable and, thus, it may be implemented without requiring the additional complexity of the methodology of system 30a. Conversely, if sufficient hardware and software either already exist or may be acceptably included within a given system, then the reduced power demands of system 30a may be achieved in such a system.

From the above, it may be appreciated that the above embodiments provide for improved apparatus and methodology for synchronization word detection in binary communication systems, such as TDMA systems by way of example. The various embodiments described above further demonstrate the flexibility of the present inventive teachings and, from this, one skilled in the art should be able to appreciate alternative configurations which may implement various of the principles discussed. For example, while the approaches described above perform bitwise comparison using the technique of a +1/−1 bit representation in combination with multiplication and summing, alternative techniques could be used where each pair of bits are compared to one another to determine if the bits match one another. In this regard, various logic operations (e.g., summing the true results of a bitwise logical AND) could be used as are known in the art. As another example of the inventive flexibility, while system 10 of FIG. 1 is presented as a context in which the embodiments may be implemented, numerous other communication environments may implement the present teachings as well. Given these examples as well as others either presented above or ascertainable by one skilled in the art, it should now be appreciated that while the present embodiments have been described in detail, various substitutions, modifications or alterations could be made to the descriptions set forth above without departing from the inventive scope which is defined by the following claims.

What is claimed is:

1. A communication system, comprising:
    circuitry for receiving a bitstream packet, the bitstream packet comprising:
        a plurality of preamble prefix bits having a predetermined bit pattern;
        a plurality of synchronization word bits following the plurality of preamble prefix bits; and
        a plurality of data bits following the plurality of synchronization word bits;
    circuitry for completing a carrier and clock recovery operation in response to receiving a first portion of the plurality of preamble prefix bits;
    circuitry for determining a location of the plurality of synchronization word bits within the bitstream packet, the circuitry for determining comprising circuitry for performing a number of comparisons between a bit test pattern vector and a sample vector of bits from the bitstream packet;
        wherein the bit test pattern vector and the sample vector of bits both change for each of the number of comparisons;
        wherein for at least one of the number of comparisons the sample vector of bits comprises a second portion of the plurality of preamble prefix bits following the first portion of the plurality of preamble prefix bits; and
        wherein for at least some of the number of comparisons the bit test pattern vector comprises one or more bits matching the predetermined bit pattern of the plurality of preamble prefix bits and further comprises one or more bits matching the synchronization word bits.

2. The communication system of claim 1 wherein, for all of the number of comparisons except one of the comparisons, the bit test pattern vector comprises one or more bits matching the predetermined bit pattern of the plurality of preamble prefix bits and further comprises one or more bits matching at least a portion of the synchronization word bits.

3. The communication system of claim 2 wherein, for the except one of the comparisons, the bits in the bit test pattern vector match the bits in the synchronization word bits.

4. The communication system of claim 3 wherein the circuitry for determining the location of the plurality of synchronization word bits within the bitstream packet further comprises:
    circuitry for providing a measure of accuracy for each of the number of comparisons; and
    circuitry for storing the measure of accuracy for each of the number of comparisons.

5. The communication system of claim 1 wherein for at least some of the number of comparisons the bit test pattern vector comprises one or more bits matching the predetermined bit pattern of the plurality of preamble prefix bits and further comprises a number of bits matching all of the synchronization word bits.

6. The communication system of claim 5 wherein, for all of the number of comparisons except one of the comparisons, the bit test pattern vector comprises one or more bits matching the predetermined bit pattern of the plurality of preamble prefix bits and further comprises a number of bits matching all of the synchronization word bits.

7. The communication system of claim 6 wherein, for the except one of the comparisons, the bits in the bit test pattern vector match the bits in the synchronization word bits.

8. The communication system of claim 7 wherein the circuitry for determining the location of the plurality of synchronization word bits within the bitstream packet further comprises:
    circuitry for providing a measure of accuracy for each of the number of comparisons; and
    circuitry for storing the measure of accuracy for each of the number of comparisons.

9. The communication system of claim 1 wherein the circuitry for determining the location of the plurality of synchronization word bits within the bitstream packet further comprises:
    circuitry for providing a measure of accuracy for each of the number of comparisons; and
    circuitry for storing the measure of accuracy for each of the number of comparisons.

10. The communication system of claim 9:
    wherein the bit test pattern vector is represented by a positive one for each bit of a first logical state and by a negative one for each bit of a second logical state different than the first logical state;
    wherein the sample vector of bits is represented by a positive one for each bit of the first logical state and by a negative one for each bit of the second logical state; and
    wherein the circuitry for performing a number of comparisons between the bit test pattern vector with the sample vector of bits comprises:
        circuitry for performing a bitwise multiplication of the bit test pattern vector with the sample vector of bits; and
        circuitry for summing a product of each of the bitwise multiplication operations.

11. The communication system of claim 10 wherein the circuitry for determining the location of the plurality of synchronization word bits within the bitstream packet determines that the synchronization word bits are located in a position within the bitstream packet corresponding to the largest of the stored measures of accuracy.

12. The communication system of claim 9 wherein the circuitry for determining the location of the plurality of synchronization word bits within the bitstream packet determines that the synchronization word bits are located in a position within the bitstream packet corresponding to the largest of the stored measures of accuracy.

13. The communication system of claim 1 wherein the second portion of the plurality of preamble prefix bits immediately follows the first portion of the plurality of preamble prefix bits.

14. The communication system of claim 1 wherein the circuitry for determining the location of the plurality of synchronization word bits within the bitstream packet further comprises circuitry for correcting the circuit,y for performing a number of comparisons, wherein the correcting circuitry is responsive to a normalized variance of additive Gaussian noise signal in the bitstream packet.

15. The communication system of claim 1 wherein the bitstream packet comprises a time division multiple access bitstream packet.

16. The communication system of claim 9 wherein t he circuitry for receiving and the circuitry for determining form a first receiver unit, and wherein the system further comprises a transmitter unit for transmitting the bitstream packet to the first receiver unit.

17. The communication system of claim 16:
wherein the bitstream packet is one packet in a plurality of bitstream packets;
wherein the first receiver unit receives each of the plurality of bitstream packets; and
wherein for each of the plurality of bitstream packets, the circuitry for determining determines a location of a plurality of synchronization word bits within the corresponding one of the plurality of bitstream packets.

18. The communication system of claim 17 wherein, for each of the plurality of bitstream packets, the circuitry for performing performs a number of comparisons between a test pattern vector and a sample vector of bits from the bitstream packet corresponding to the bitstream packet;
wherein, for each of the plurality of bitstream packets, the bit test pattern vector and the sample vector of bits both change for each of the number of comparisons corresponding to the bitstream packet;
wherein, for each of the plurality of bitstream packets, for at least one of the number of comparisons corresponding to the bitstream packet the sample vector of bits comprises a second portion of the plurality of preamble prefix bits following the first portion of the plurality of preamble prefix bits; and
wherein, for each of the plurality of bitstream packets, for at least some of the number of comparisons corresponding to the bitstream packet the bit test pattern vector comprises one or more bits matching the predetermined bit pattern of the plurality of preamble prefix bits and further comprises one or more bits matching the synchronization word bits.

19. The communication system of claim 17:
and further comprising a plurality of receiver units in addition to the first receiver unit; and
wherein each of the plurality of bitstream packets is directed to a different one of either the first receiver unit or one of the plurality of receiver units.

20. The communication system of claim 16:
wherein the bitstream packet further comprises a code for identifying the first receiver unit;
wherein the code immediately follows the plurality of synchronization word bits; and
wherein the plurality of data bits immediately follows the code.

21. A method of operating a communication system, comprising:
receiving a bitstream packet, the bitstream packet comprising:
a plurality of preamble prefix bits having a predetermined bit pattern;
a plurality of synchronization word bits following the plurality of preamble prefix bits; and
a plurality of data bits following the plurality of synchronization word bits;
completing a carrier and clock recovery operation in response to receiving a first portion of the plurality of preamble prefix bits;
determining a location of the plurality of synchronization word bits within the bitstream packet by performing a number of comparisons between a bit test pattern vector and a sample vector of bits from the bitstream packet;
wherein the bit test pattern vector and the sample vector of bits both change for each of the number of comparisons;
wherein for at least one of the number of comparisons the sample vector of bits comprises a second portion of the plurality of preamble prefix bits following the first portion of the plurality of preamble prefix bits; and
wherein for at least some of the number of comparisons the bit test pattern vector comprises one or more bits matching the predetermined bit pattern of the plurality of preamble prefix bits and further comprises one or more bits matching the synchronization word bits.

22. The method of claim 21 wherein the performing step comprises, for all of the number of comparisons except one of the comparisons, performing the number of comparisons such that the bit test pattern vector comprises one or more bits matching the predetermined bit pattern of the plurality of preamble prefix bits and further comprises one or more bits matching at least a portion of the synchronization word bits.

23. The method of claim 22 wherein the performing step comprises, for the except one of the comparisons, performing the one comparison such that the bits in the bit test pattern vector match the bits in the synchronization word bits.

24. The method of claim 23 wherein for at least some of the step of performing a number of comparisons the bit test pattern vector comprises one or more bits matching the predetermined bit pattern of the plurality of preamble prefix bits and further comprises a number of bits matching all of the synchronization word bits.

25. The method of claim 24 wherein the performing step comprises, for all of the number of comparisons except one of the comparisons, performing the number of comparisons such that the bit test pattern vector comprises one or more bits matching the predetermined bit pattern of the plurality of preamble prefix bits and further comprises a number of bits matching all of the synchronization word bits.

26. The method of claim 25 wherein the performing step comprises, for the except one of the comparisons, performing the one comparison such that the bits in the bit test pattern vector match the bits in the synchronization word bits.

27. The method of claim 21 wherein the step of for determining the location of the plurality of synchronization word bits within the bitstream packet further comprises:

providing a measure of accuracy for each of the number of comparisons; and storing the measure of accuracy for each of the number of comparisons.

28. The method of claim 24:

wherein the bit test pattern vector is represented by a positive one for each bit of a first logical state and by a negative one for each bit of a second logical state different than the first logical state;

wherein the sample vector of bits is represented by a positive one for each bit of the first logical state and by a negative one for each bit of the second logical state; and wherein the step of performing a number of comparisons between the bit test pattern vector with the sample vector of bits comprises:

performing a bitwise multiplication of the bit test pattern vector with the sample vector of bits; and summing a product of each of the bitwise multiplication operations.

29. The method of claim 26 wherein the step of determining the location of the plurality of synchronization word bits within the bitstream packet determines that the synchronization word bits are located in a position within the bitstream packet corresponding to the largest of the stored measures of accuracy.

30. The method of claim 21 wherein the second portion of the plurality of preamble prefix bits immediately follows the first portion of the plurality of preamble prefix bits.

31. The method of claim 21 wherein the step of determining the location of the plurality of synchronization word bits within the bitstream packet further comprises correcting the circuitry for performing a number of comparisons, wherein the correcting step is responsive to a normalized variance of additive Gaussian noise signal in the bitstream packet.

32. The method of claim 21 wherein the bitstream packet comprises a time division multiple access bitstream packet.

* * * * *